United States Patent
Cornick et al.

(10) Patent No.: US 6,670,793 B1
(45) Date of Patent: Dec. 30, 2003

(54) DYNAMIC SERIES VOLTAGE COMPENSATOR AND METHOD THEREOF

(75) Inventors: Keith Joseph Cornick, Singapore (SG); Hongqun Li, Singapore (SG); Pak Khian Hee, Singapore (SG)

(73) Assignee: SP Systems PTE LTD, Singapore (SG)

( * ) Notice: Subject to any disclaimer, the term of this patent is extended or adjusted under 35 U.S.C. 154(b) by 0 days.

(21) Appl. No.: 10/019,591

(22) PCT Filed: Apr. 25, 2000

(86) PCT No.: PCT/SG00/00057

§ 371 (c)(1),
(2), (4) Date: Apr. 25, 2002

(87) PCT Pub. No.: WO01/82443

PCT Pub. Date: Nov. 1, 2001

(51) Int. Cl.$^7$ ................................................. G05F 1/70
(52) U.S. Cl. ....................................................... 323/207
(58) Field of Search ............................... 323/205, 207, 323/210, 211

(56) References Cited

U.S. PATENT DOCUMENTS

| | | | |
|---|---|---|---|
| 4,384,321 A | * | 5/1983 | Rippel ........................ 363/124 |
| 5,329,222 A | | 7/1994 | Gyugyi et al. |
| 5,369,353 A | | 11/1994 | Erdman |
| 5,747,972 A | * | 5/1998 | Baretich et al. ............. 323/223 |
| 5,883,796 A | | 3/1999 | Cheng et al. |
| 5,936,855 A | | 8/1999 | Salmon |
| 5,984,173 A | | 11/1999 | Edwards |
| 6,075,349 A | * | 6/2000 | Okayama .................... 323/207 |
| 6,115,268 A | | 9/2000 | Chang et al. |
| 6,118,676 A | | 9/2000 | Divan et al. |
| 6,175,166 B1 | | 1/2001 | Bapat |
| 6,225,791 B1 | | 5/2001 | Fujii et al. |
| 6,242,895 B1 | * | 6/2001 | Fujii et al. ................... 323/207 |

FOREIGN PATENT DOCUMENTS

| | | |
|---|---|---|
| JP | 5-184150 | 7/1993 |
| JP | 6-38532 | 2/1994 |
| JP | 2001-76486 | 3/2001 |
| WO | WO93/18567 | 9/1993 |

* cited by examiner

Primary Examiner—Adolf D. Berhane
(74) Attorney, Agent, or Firm—Merchant & Gould, P.C.

(57) ABSTRACT

A dynamic series voltage compensator (10) for compensating voltage dips in an ac electric power system is described. The compensator (10) has a controller (11) coupled to control a respective series injection inverter (12a, 12b, 12c). The controller (11) monitors a supply voltage with/on a respective phase. Inputs from monitoring the supply voltage are processed by the controller (11) to generate control signals. These control signals are based on comparing voltage magnitude of a present voltage cycle period with voltage magnitude of a preceding voltage cycle period of the supply voltage. When difference between the present and the preceding voltage cycle periods exceeds a predetermined value for a corresponding time period, and inverter control signal is provided to the respective series injection inverter (12a, 12b, 12c) to thereby provide a compensation voltage. The compensation voltage is injected directly to the respective conductor. The voltage magnitude of the compensation voltage is to compensate the supply voltage to a normal level based on the preceding voltage cycle period.

24 Claims, 7 Drawing Sheets

DYNAMIC SERIES VOLTAGE COMPENSATOR AND METHOD THEREOF

FIELD OF THE INVENTION

This invention relates to alternating current (ac) electric power systems for providing ac electric power. In particular, this invention relates to series voltage compensators for compensating voltage dips in such ac electric power systems and method thereof.

BACKGROUND

As is known in the art, an alternating current (ac) electric power system provides for generation, transmission and subsequent distribution of ac electric power to consumer locations. These consumer locations can be, for example, residential homes, commercial premises and industrial buildings or factories. Typically, an ac electric power system includes, among other things, conductors on which ac electric power is supplied to the consumer locations. Examples of such conductors include underground cables and overhead lines.

Conventionally, voltage of ac electric power generated from a power source is first stepped up for transmission and then stepped down for distribution. Generally, distribution voltages are in the kilovolt (kV) range. Such distribution voltages are then stepped down to a consumer voltage level that is commonly at 400 Volts (V). In most ac electric power systems, ac electric power is supplied to a consumer location via a multiplicity of connections forming an ac power supply network.

In distributing ac electric power to consumer locations, faults may occur within an ac power supply network. These faults can be, for example, an underground cable damaged by civil works or an overhead line failure due to lightning strikes. Such faults adversely affect supply voltages to consumer locations and are commonly referred to as voltage disturbances.

One type of voltage disturbance is known as a voltage dip. A voltage dip is a sudden and momentary reduction in a supply voltage from a normal level. Generally, magnitude and duration of a voltage dip depends on the causes of the voltage dip and also on control measures that are implemented to restore the supply voltage to its normal level. For example, the duration of a voltage dip typically depends on, among other things, the time taken to identify the fault location causing the voltage dip and for circuit breakers to trip and isolate the fault location.

Generally, the magnitude of a voltage dip is greater when nearer, in electrical terms, to the fault location causing the voltage dip. Hence, the magnitude of the voltage dip is usually different at different consumer locations and may range from 10% to 80% of a supply voltage. Also, in ac electric power systems providing supply voltages in two or more phases (polyphase), the magnitude of a voltage dip is generally different in each of these phases. Often, a single-phase line-to-ground fault at a fault location can end up as a voltage dip on all phases at a consumer location This is due to use of star-delta transformers that are known to transfer at least some magnitude of a voltage dip in one phase to the other phase(s).

One technique to compensate for a voltage dip is described in U.S. Pat. No. 5,329,222 issued to Gyugyi et al on Jul. 12$^{th}$, 1994. This patent describes an apparatus and method for compensating utility line transients with a series injection voltage. However, the use of a three-phase inverter and a transformer for coupling the three-phase inverter into a high voltage distribution system results in the series injection voltage on each phase being coupled to each other to some extent. Coupling the series voltage injection voltage as such is not appropriate because a voltage dip may be different on all three phases and varying differently in time for each of these three phases.

Another technique to compensate for voltage dips is described in U.S. Pat. No. 5,883,796 issued to Cheng et al on Mar. 16$^{th}$, 1999. This patent describes an apparatus and method for restoring voltage dips using a three-phase series injection inverter. Consequently, injection voltages provided by the apparatus and method of this patent has a similar limitation as in U.S. Pat. No. 5,329,222 in that the injection voltages are again coupled to some extent.

Yet another technique to compensate for voltage dips in supply voltages is with a current-to-voltage compensator. Current-to-voltage compensators operate on the basis that most voltage disturbances are due to single-phase line-to-ground faults in which the remaining phase(s) is(are) normal. By taking current from the normal phase(s) during a single-phase voltage dip, and by means of a semiconductor inverter converting this current into a series compensation voltage, the phase having the voltage dip can thus be compensated. Consequently, current-to-voltage compensators cannot adequately compensate voltage dips for all phases, particularly when all three phases have voltage dips.

In addition to the difficulty of compensating voltage dips in a single phase for a polyphase ac electric power system, energy storage in the above compensators is also a problem. This is because capacitors are typically used to store energy to provide injection or compensation voltages. Such capacitors can be expensive when a large energy storage capacity is required so as to provide compensation voltages for voltage dips of long durations.

Furthermore, voltage compensators using series injection inverters provide inverter voltages that are typically insufficient in magnitude to compensate voltage dips in ac electric power distribution systems. As such, these inverter voltages have to be stepped up in magnitude using step-up transformers. Use of step-up transformers adds significantly to the cost of conventional voltage compensators and this makes such compensators less desirable for general low-cost applications.

In addition to the above voltage compensators, uninterrupted power supplies (UPSs) can also be used to compensate voltage dips on one or more phases of an ac electric power system. However, UPSs are designed primarily to compensate another type of voltage disturbance known as a voltage collapse. In a voltage collapse, supply voltages to consumer locations are totally absent. Consequently, a UPS has to fully provide the supply voltages over the entire duration of the voltage collapse. This duration is typically much longer than that of voltage dips. Hence, a UPS requires energy storage that is substantially larger in capacity compared to voltage compensators having series injection inverters. Furthermore, inverters of UPSs operate in a continuous high frequency switching mode even in the absence of any voltage disturbance. Attendant losses during the continuous high frequency switching mode makes a UPS inefficient under normal supply voltage conditions.

Voltage dips can cause substantial financial losses especially when commercial or industrial operations are affected. Hence, alleviating voltage dips in an ac electric power system is desirable. Thus, a need clearly exists for a series voltage compensator that addresses the above problems in ac electric power systems to thereby provide supply voltages that are stable and reliable without incurring substantial additional costs.

SUMMARY

In accordance with one aspect of the invention, there is disclosed a dynamic series voltage compensator for compensating voltage dips in an alternating current electric power system providing at least one supply voltage, each of the at least one supply voltage being at a respective phase, the dynamic series voltage compensator including:

means for independently monitoring each of the at least one supply voltage;

means for generating digital signals indicative of voltage magnitude of the each of the at least one supply voltage over a present voltage cycle period;

means for comparing the digital signals with stored data indicative of voltage magnitude of the each of the at least one supply voltage over a preceding voltage cycle period;

means for determining difference between the digital signals and the stored data at corresponding time periods within the present and preceding voltage cycle periods;

and means for controlling, when the difference exceeds a predetermined value for a corresponding time period, at least one series injection inverter to inject a compensation voltage directly to a respective conductor on which the each of the at least one supply voltage is supplied, the compensation voltage having a magnitude to compensate the each of the at least one supply voltage to a voltage magnitude of the preceding voltage cycle period immediately before a voltage dip at the corresponding time period.

Generally, the generating means can include means for filtering the digital signals.

Typically, the dynamic series voltage compensator can further include means for storing the digital signals.

More typically, the storing means can include means for locking the stored data.

Generally, the controlling means can include means for controlling the at least one series injection inverter to receive energy from at least one energy storage device for the compensation voltage.

Typically, the controlling means can include means for controlling at least one solid-state earthing switch, the at least one solid-state earthing switch being to selectably connect an input of the at least one series injection inverter to a reference ground or to the each of the at least one supply voltage.

Generally, the controlling means can include means for controlling at least one pulse generator, the at least one pulse generator providing pulses synchronised to drive the at least one series injection inverter to provide two output pulses within one switching period.

Typically, the controlling means can include means for controlling at least one solid-state bypass switch, the at least one solid-state bypass switch connecting an input of the at least one series injection inverter to an output of the at least one series injection inverter.

In accordance with another aspect of the invention, there is disclosed a method for compensating voltage dips in an alternating current electric power system providing at least one supply voltage, each of the at least one supply voltage being at a respective phase. The method including the steps of:

independently monitoring each of the at least one supply voltage;

generating, in response to the independently monitoring step, digital signals indicative of voltage magnitude of the each of the at least one supply voltage over a present voltage cycle period;

comparing the digital signals with stored data indicative of voltage magnitude of the each of the at least one supply voltage over a preceding voltage cycle period;

determining difference between the digital signals and the stored data at corresponding time periods within the present and preceding voltage cycle periods;

and controlling, when the difference exceeds a predetermined value for a corresponding time period, at least one series injection inverter to inject a compensation voltage directly to a respective conductor on which the each of the at least one supply voltage is supplied, the compensation voltage having a magnitude to compensate the each of the at least one supply voltage to a voltage magnitude of the preceding voltage cycle period immediately before a voltage dip at the corresponding time period.

Generally, the generating step can include the step of filtering the digital signals.

Typically, the method can further include the step of storing the digital signals.

More typically, the storing step includes the step of locking the stored data.

Generally, the controlling step can include the step of controlling the at least one series injection inverter to receive energy from at least one energy storage device for the compensation voltage.

Typically, the controlling step can include the step of controlling at least one solid-state earthing switch, the at least one solid-state earthing switch being to selectably connect an input of the at least one series injection inverter to a reference ground or to the each of the at least one supply voltage.

Generally, the controlling step can include the step of controlling at least one pulse generator, the at least one pulse generator being providing pulses synchronised to drive the at least one series injection inverter to provide two output pulses within one switching period.

Typically, the controlling step can include the step of controlling at least one solid-state bypass switch, the at least one bypass switch connecting an input of the at least one series injection inverter to an output of the at least one series injection inverter.

In accordance with a further aspect of the invention, there is disclosed a computer program product with a computer usable medium having a computer readable program code means embodied therein for compensating voltage dips in an alternating current electric power system providing at least one supply voltage, each of the at least one supply voltage being at a respective phase. The computer program product including:

computer readable program code means for independently monitoring each of the at least one supply voltage;

computer readable program code means for generating digital signals indicative of voltage magnitude of the each of the at least one supply voltage over a present voltage cycle period;

computer readable program code means for comparing the digital signals with stored data indicative of voltage magnitude of the each of the at least one supply voltage over a preceding voltage cycle period;

computer readable program code means for determining difference between the digital signals and the stored data at corresponding time periods within the present and preceding voltage cycle periods; and computer readable program code means for controlling, when the difference exceeds a predetermined value for a corresponding time period, at least one series injection inverter to inject a compensation voltage directly to a respective conductor on which the each of the at least one supply voltage is supplied, the compensation voltage having a magnitude to compensate the each of the at least one supply voltage to a voltage magnitude of the preceding voltage cycle period immediately before a voltage dip at the corresponding time period.

Generally, the computer readable program code means for generating can include computer readable program code means for filtering the digital signals.

Typically, the computer program product can further include computer readable program code means for storing the digital signals.

More typically, the computer readable program code means for storing can include computer readable program code means for locking the stored data.

Generally, the computer readable program code means for controlling can include computer readable program code means for controlling the at least one series injection inverter to receive energy from at least one energy storage device for the compensation voltage.

Typically, the computer readable program code means for controlling can include computer readable program code means for controlling at least one solid-state earthing switch, the at least one solid-state earthing switch being to selectably connect an input of the at least one series injection inverter to a reference ground or to the each of the at least one supply voltage.

Generally, the computer readable program code means for controlling can include computer readable program code means for controlling at least one pulse generator providing pulses synchronised to drive the at least one series injection inverter to provide two output pulses within one switching period.

Typically, the computer readable program code means for controlling can include computer readable program code means for controlling at least one solid-state bypass switch, the at least one solid-state bypass switch connecting an input of the at least one series injection inverter to an output of the at least one series injection inverter.

BRIEF DESCRIPTION OF THE DRAWINGS

Embodiments of the invention are described hereinafter with reference to the drawings, in which.

DETAILED DESCRIPTION

A dynamic series voltage compensator, a method and a computer program product for compensating voltage dips in an electric power system are described. In the following, numerous details are provided for a more thorough description. It shall be apparent to one skilled in the art, however, that the invention may be practised without such details. In other instances, well-known details have not been described at length so as not to obscure the invention.

The advantages of the embodiments of the invention are manifold. One advantage is that voltage dips of different phases of a supply voltage are independently compensated. Therefore, such voltage dips can be compensated with compensation voltages of different magnitudes for each of the different phases. Consequently, the supply voltage is more accurately restored using the embodiments of the invention compared with conventional series voltage compensators or systems.

Another advantage of the embodiments of the invention is that compensation voltages are directly injected into conductors of an electric power system without using a transformer. This significantly reduces cost of the embodiments of the invention as compared to conventional series voltage compensator in which compensation voltages are injected onto conductors via transformers.

A further advantage of the embodiments of the invention is that the compensation voltages provided by the embodiments of the invention are referenced to a normal level of the supply voltage and not to absolute voltage references. Consequently, such compensation voltages compensate the supply voltage according to actual supply voltage requirements of consumers rather than absolute voltage references that may not be as accurate.

Yet a further advantage of at least one of the embodiments of the invention is that a voltage collapse does not remove a ground return path for compensation voltages that are provided to replace supply voltages. This is because an earthing switch in one embodiment of the invention provides the ground return path when the voltage collapse occurs.

Figure 1:
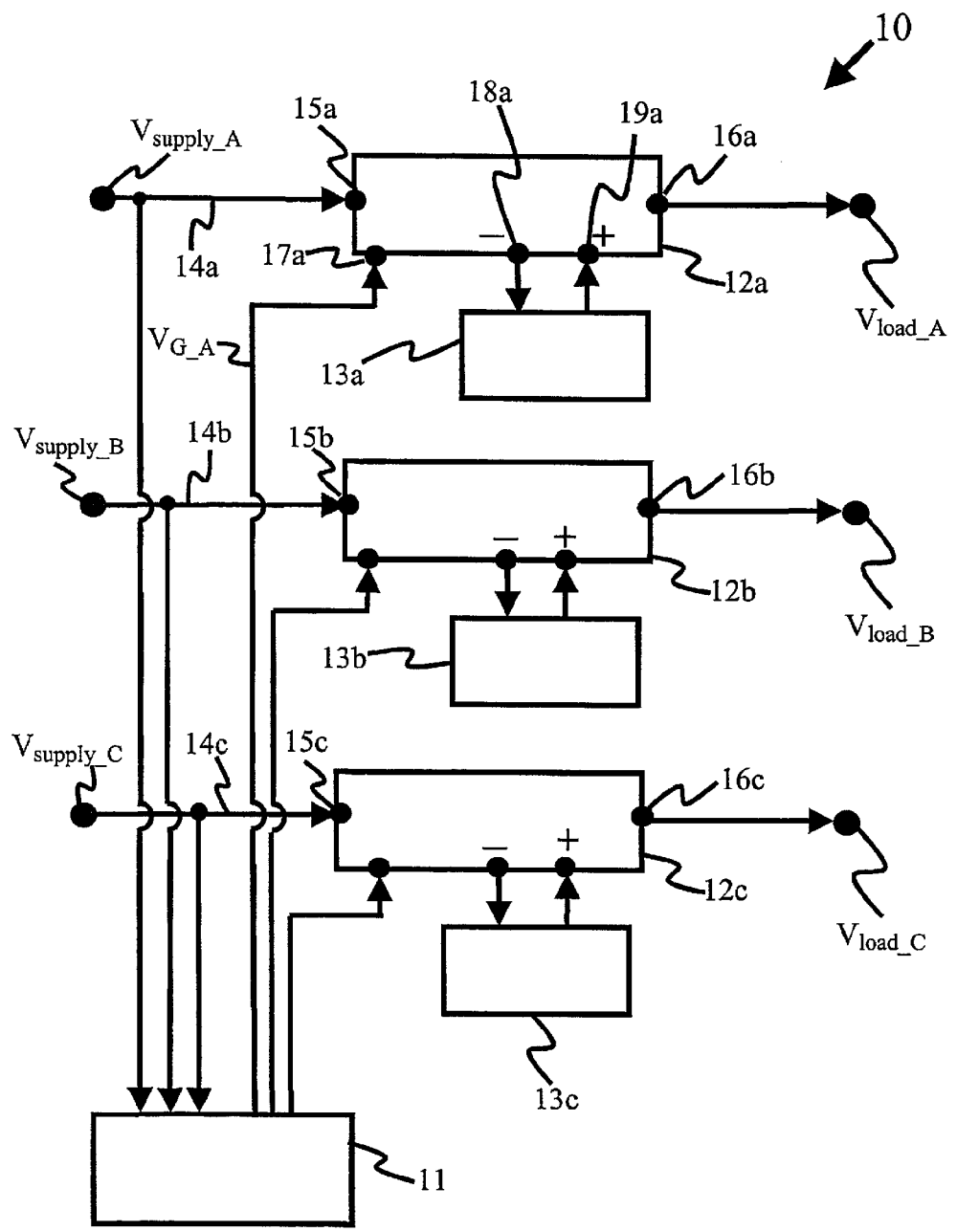
FIG. 1 is a schematic block diagram illustrating a dynamic series voltage compensator in accordance with a preferred embodiment of the invention.

Referring now to FIG. 1, a schematic block diagram of a dynamic series voltage compensator 10 for compensating voltage dips in an alternating current (ac) electric power system in accordance with a preferred embodiment of the invention is illustrated. The dynamic series voltage compensator 10 includes a controller 11, at least one series injection inverter 12a, 12b, 12c and at least one energy storage device 13a, 13b, 13c respectively coupled to the series injection inverters 12a, 12b, 12c. The controller 11 couples to respective conductors 14a, 14b, 14c on which respective supply voltages $V_{supply\_A}$, $V_{supply\_B}$ and $V_{supply\_C}$ are supplied to respective loads via the series injection inverters 12a, 12b, 12c. Each of these supply voltages $V_{supply\_A}$, $V_{supply\_B}$ and $V_{supply\_C}$ has a respective phase. Each of the series injection inverters 12a, 12b, 12c has, respectively, an input 15a, 15b, 15c and an output 16a, 16b, 16c. Each of the supply voltages $V_{supply\_A}$, $V_{supply\_B}$ and $V_{supply\_C}$ is respectively provided from the output 16a, 16b, 16c to consumer locations (not shown) such as residential homes, commercial premises and industrial buildings or factories. These consumer locations have voltage load requirements illustrated as $V_{load\_A}$, $V_{load\_B}$ and $V_{load\_C}$.

Also indicated for the series injection inverter 12a is a control input 17a for receiving control signals from the controller 11 and energy couplings 18a & 19a coupled to receive energy from the energy storage device 13a. To simplify labelling of FIG. 1, the control input 17a and energy couplings 18a,19a are not similarly labelled for the remaining two series injection inverters 12b,12c.

Figure 2:
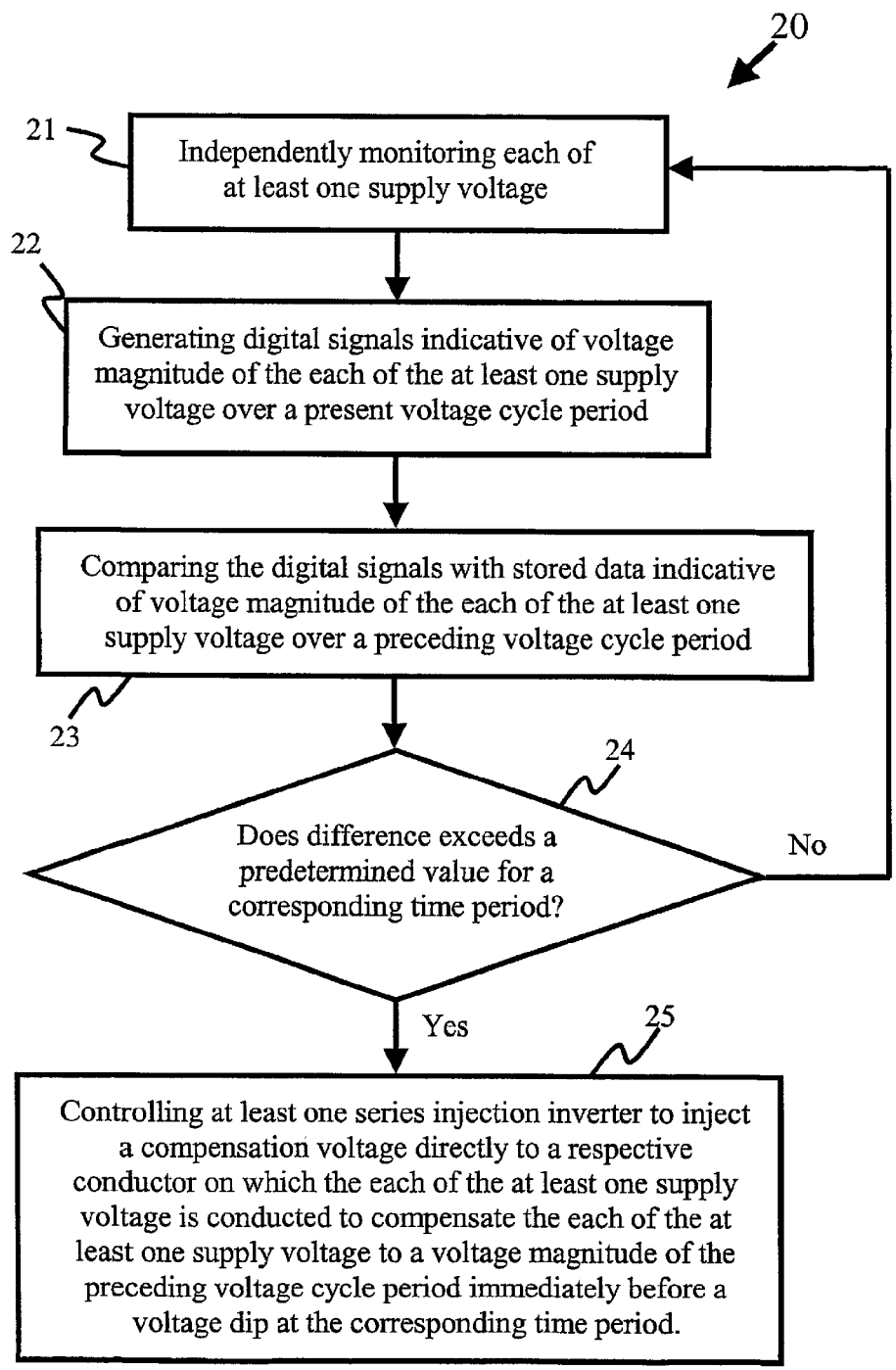
FIG. 2 is a flowchart of a method for compensating voltage dips using the dynamic series voltage compensator of FIG. 1.

In order not to obscure the invention, operation of the dynamic series voltage compensator 10 shall be described using the supply voltage $V_{supply\_A}$, the series injection inverter 12a and elements associated herewith. The other series injection inverters 12b,12c operate similarly. Referring now to FIG. 2, a method 20 for compensating voltage dips in an ac electric power system using the dynamic series voltage compensator 10 is illustrated with a flowchart.

The method 20 begins at step 21 at which the controller 11 independently monitors the supply voltage $V_{supply\_A}$. Step 21 processes input tapped from the supply voltage $V_{supply\_A}$ conducted on the conductor 14a. Thereafter, the method 20 continues to step 22 at which the input is processed to generate digital signals. These digital signals are indicative of voltage magnitude of the supply voltage $V_{supply\_A}$ over a present voltage cycle period. Following step 22, the controller 11 compares the digital signals with stored data at step 23. The stored data is indicative of voltage magnitude of the supply voltage $V_{supply\_A}$ over a preceding voltage cycle period.

Comparing these voltage magnitudes enables the controller 11 to determine, at decision step 24, the difference between the digital signals and the stored data. This difference is computed at corresponding time periods of the present and preceding voltage cycle periods. When the difference exceeds a predetermined value for a corresponding time period, output from the decision step 24 is a "yes". Consequently, the controller 11 then controls the series injection inverter 12a to inject a compensation voltage directly to the conductor 14a at step 25. The compensation voltage has a magnitude that compensates $V_{supply\_A}$ to a voltage magnitude of the preceding voltage cycle period immediately before a voltage dip at the corresponding time period. Compensating each of the other supply voltages $V_{supply\_B}$, $V_{supply\_C}$, to thereby compensate the supply voltages $V_{supply\_B}$, $V_{supply\_C}$ to a voltage magnitude of their respective preceding voltage cycle periods preceding the voltage dip is also done independently when necessary and based on the predetermined value. Otherwise, when the difference is less than the predetermined value, output from the decision step 24 is a "No". With this "No", the method 20 returns to step 21 at which the controller 11 monitors another time period of the present voltage cycle period of the supply voltage $V_{supply\_A}$.

As the difference between the digital signals and the stored data is based on the voltage magnitudes of the present and the preceding voltage cycle periods of the supply voltage $V_{supply\_A}$, magnitude of the compensation voltage can thus be determined to compensate the supply voltage $V_{supply\_A}$ to a voltage magnitude of the preceding voltage cycle period at the corresponding time period. This magnitude is thus compensating a voltage dip that reduces the voltage magnitude of the present voltage cycle period from a normal level that was provided at that corresponding time period of the preceding voltage cycle period immediately before the voltage dip.

Figure 3:
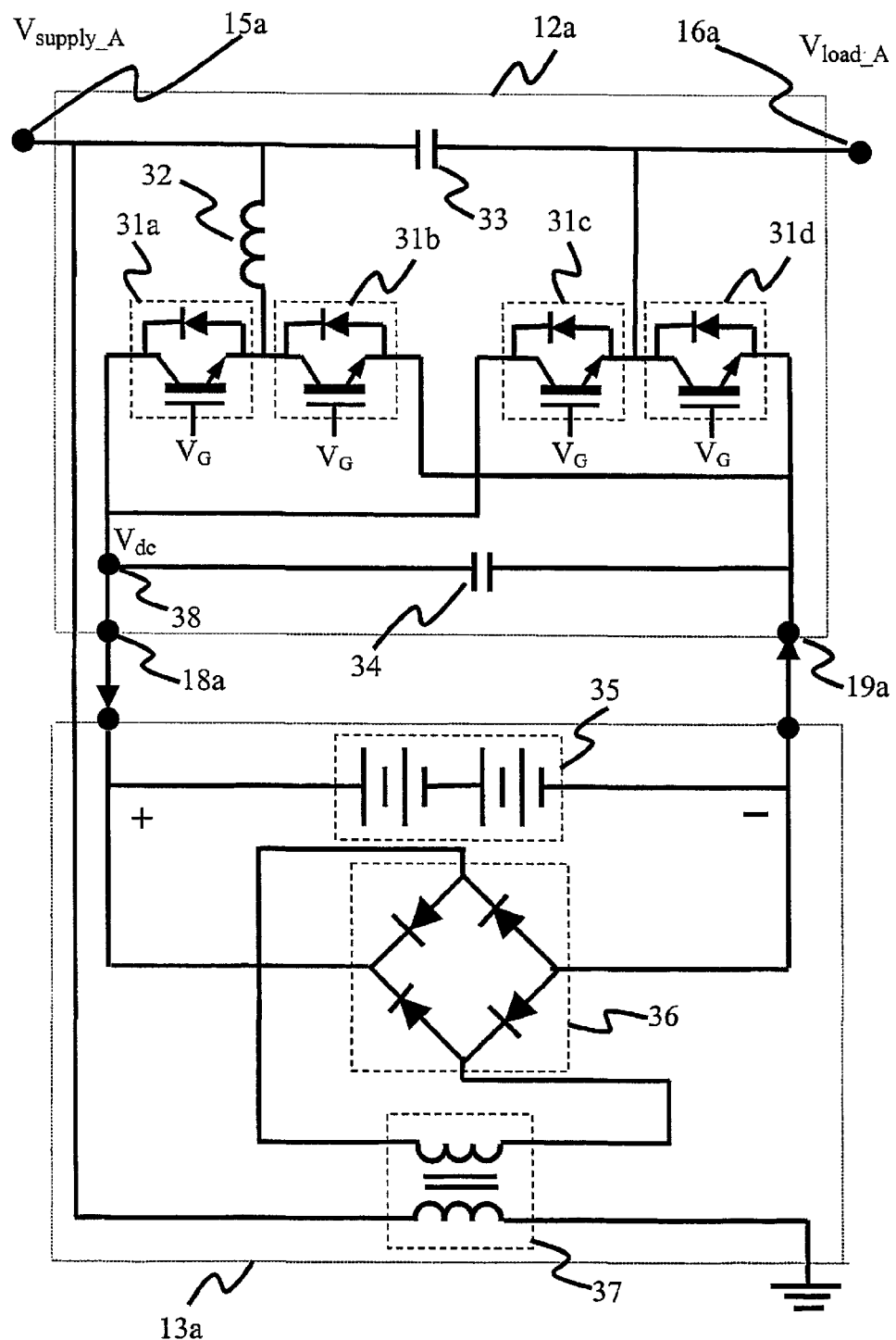
FIG. 3 is a schematic diagram illustrating examples of a series injection inverter and an energy storage device of the dynamic series voltage compensator of FIG. 1.

Injecting the compensation voltage directly to the conductor 14a can be achieved by controlling the series injection inverter 12a to receive energy from the energy storage device 13a. Referring now to FIG. 3, a schematic block diagram illustrates examples of the series injection inverter 12a and the energy storage device 13a.

The series injection inverter 12a has a H-type bridge with four switching blocks 31a,31b,31c,31d. Each of these four switching blocks 31a,31b,31c,31d has a solid-state switch coupled to a diode. Pulse width modulated (PWM) signals are used to drive the H-type bridge such that, after filtering output from the H-type bridge with inductor 32 and capacitor 33, a compensation voltage is supplied across capacitor 33. The inductor 32 and the capacitor 33 filter out high frequency components of the PWM signals.

Power for the solid-state inverter is obtained from the energy storage device 13a that includes a capacitor bank 34 and battery bank 35. The energy storage device 13a also includes a bridge rectifier 36 and a transformer 37.

Control signals $V_G$ from the controller 11 are selectively provided to respective gates of each of the switching blocks 31a,31b,31c,31d. These control signals $V_G$ activate the series injection inverter 12a to receive energy from the energy storage device 13a The energy storage device 13a is charged over a period of time by the transformer 37 and bridge rectifier 36.

The control signals $V_G$ from the controller 11 are PWM signals. These PWM signals drive the H-type bridge such that the desired compensation voltage is derived from the energy storage device 13a. Generation of the PWM signals from the controller 11 requires processing of the inputs tapped from the supply voltage $V_{supply\_A}$ that is conducted on the conductor 14a.

Figure 4:
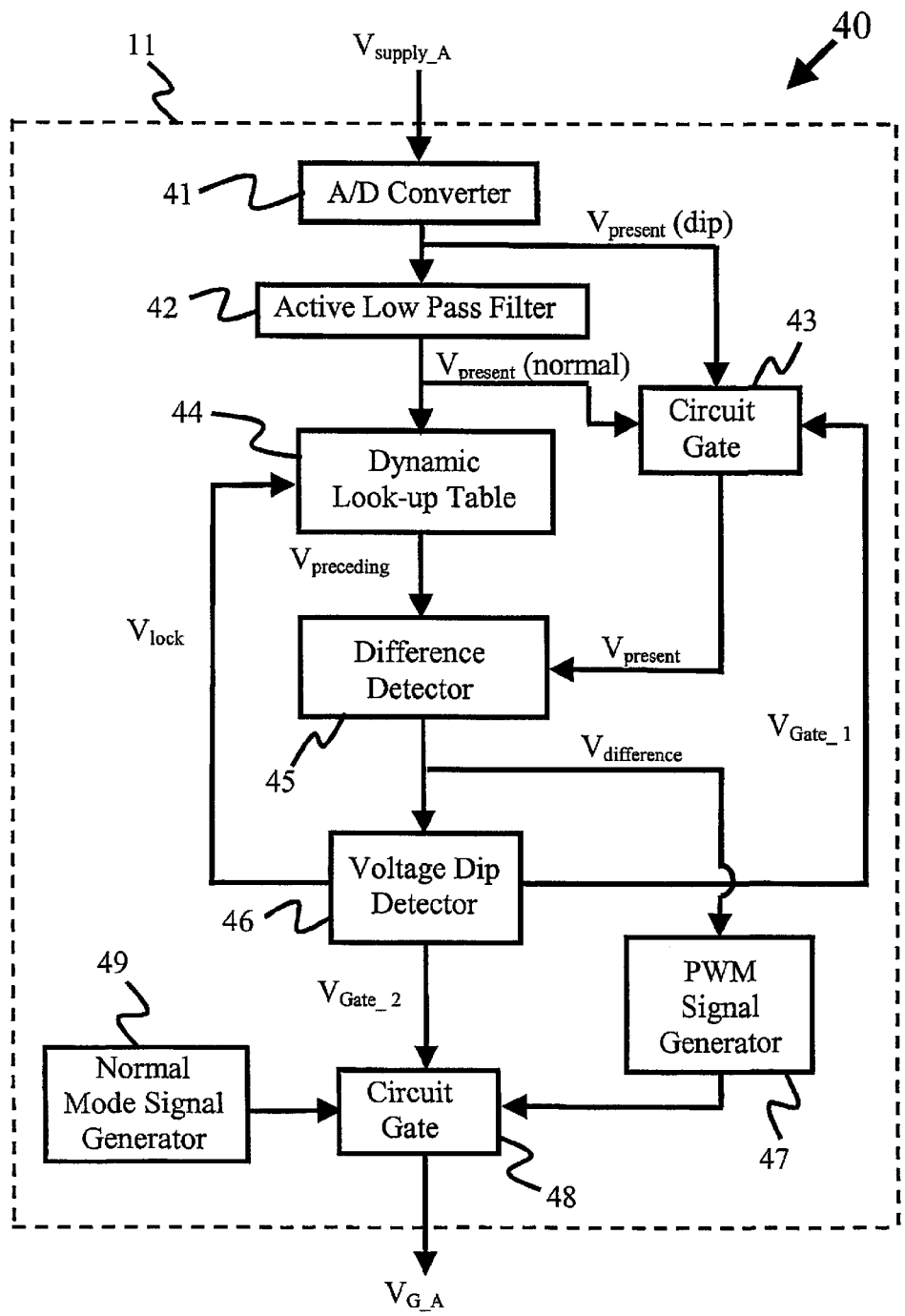
FIG. 4 is a signal process flow of a controller of the dynamic series voltage compensator of FIG. 1.

Referring now to FIG. 4, a signal process flow 40 of the controller 11 is illustrated. The inputs are passed through an analog-to-digital (A/D) converter 41 from which digital signals that are indicative of voltage magnitude of the supply voltage $V_{supply\_A}$ are derived. These digital signals are provided to an active low pass filter 42. Input to the circuit gate 43 can be from the A/D converter 41 or the active low pass filter 42 depending on whether a voltage dip has been detected. Setting of the circuit gate 43 is explained below.

From the active low pass filter 42, a low-noise signal output, labelled as $V_{present}$ (normal), is compared to the stored data that is stored in a dynamic look-up table 44. The dynamic look-up table 44 stores instantaneous values of the supply voltage $V_{supply\_A}$ sampled at regular intervals within one cycle period. This cycle period is a continuously moving time window of the supply voltage $V_{supply\_A}$. The stored data in the dynamic look-up table 44 is sequentially updated to cover one cycle period of the supply voltage $V_{supply\_A}$.

The stored data from the dynamic look-up table 44, labelled as $V_{preceding}$, and signal output from the circuit gate 43, labelled as $V_{present}$, are provided to a difference detector 45. From the difference detector 45, a difference signal ($V_{difference}$) is generated. $V_{difference}$ is indicative of the difference in the voltage magnitude between the present and the preceding voltage cycle periods of the supply voltage $V_{supply\_A}$ for a corresponding time period.

In the voltage dip detector 46, $V_{difference}$ is checked against a predetermined value. When $V_{difference}$ is greater than the predetermined value, then a command signal ($V_{lock}$ is sent back to the dynamic look-up table 44 to lock the stored data. Hence, when a voltage dip occurs, instantaneous values in the dynamic look-up table 44 of the preceding voltage cycle period immediately before the voltage dip is locked. The stored data in the dynamic look-up table 44 at the commencement of a voltage dip is therefore a replica of the voltage cycle period of the supply voltage $V_{supply\_A}$ immediately before the voltage-dip. Locking the stored data enables voltage dips with duration of more than one cycle period to be consistently compared with the preceding voltage cycle period immediately before the voltage dip. It is to be noted that the voltage dip can occur at any point of a cycle period. A gate control signal ($V_{Gate\_1}$) is also sent to change the circuit gate 43 from 'normal' to 'dip'.

Operation of the circuit gate 43 depends on $V_{Gate\_1}$. Under normal conditions with no voltage dip, $V_{Gate\_1}$ sets the circuit gate 43 to provide $V_{present}$ (normal) based on output received directly from the active low pass filter 42. Otherwise, when a voltage dip is detected, $V_{Gate\_1}$ sets the circuit gate 43 to provide $V_{present}$ (dip) based on output received directly from the A/D converter 41.

When $V_{difference}$ is greater than the predetermined value, another gate control signal ($V_{Gate\_2}$) changes a gate circuit 48 from a normal mode to a PWM mode. In the normal mode, output from the gate circuit 48 is provided by a normal mode signal generator 49. In the PWM mode, $V_{difference}$ is provided to a PWM signal generator 47 and output from the gate circuit 48 is provided by the PWM signal generator 47.

In the PWM mode, the PWM signal generator 47 produces a PWM output signal that serves as an inverter control signal. This inverter control signal is provided as $V_{G\_A}$ to control the dynamic series injection inverter 12a. $V_{G\_A}$ controls the switching blocks 31a,31b,31c,31d to provide a compensation voltage to compensate the voltage dip.

Figure 5B:
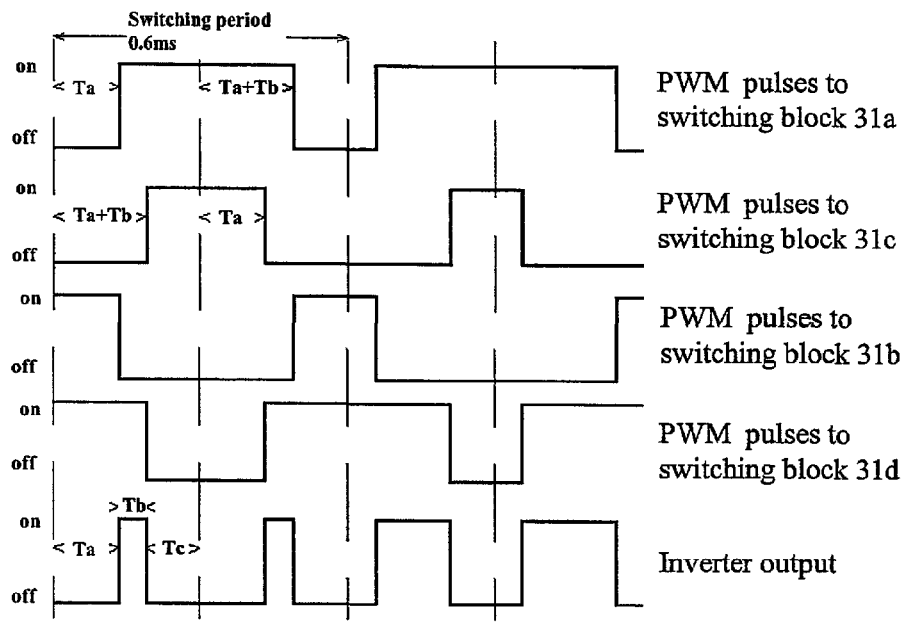
FIG. 5a and FIG. 5b illustrate a simplified scheme for generating inverter control signals by the controller of FIG. 4.
Figure 5A:
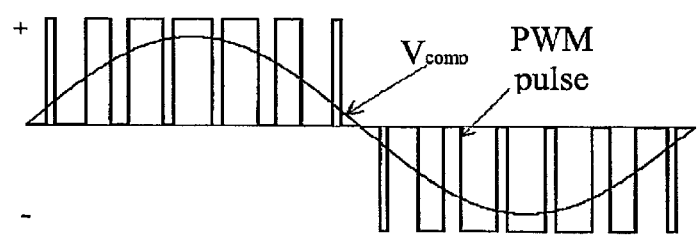

The PWM output signal is generated when the PWM signal generator 47 is activated in response to $V_{difference}$ being greater than the predetermined value. FIG. 5a and FIG. 5b illustrate a simplified scheme for generating inverter control signals.

FIG. 5a illustrates a compensation voltage, $V_{comp}$, in the form of a sine wave that may be required to be injected into the conductor 14a. This sine wave is built up from a series of pulses generated at a frequency of; for example, 3.3 kHz by the switching blocks 31a,31b,31c,and 31d. The inductor 32 and the capacitor 33 of FIG. 3 filter out harmonic components of these pulses to provide a compensation voltage $V_{comp}$. The PWM signal generator 47 produces the pulses necessary for switching the switching blocks 31a, 31b,31c,31d via which the compensation voltage $V_{comp}$ is generated. Two sets of pulses are required for the switching blocks 31a,31b,31c,31d. One set of pulses controls switching block 31a and the other set of pulses controls switching block 31c.

The switching blocks 31b and 31d are controlled by inverted signals generated by hard-wired circuitry operating on the inverter control signals $V_{G\_A}$ for switching blocks 31a and 31c. FIG. 5b illustrates the sequence of pulses produced by the PWM signal generator 47. The fundamental repetition rate at which the PWM pulse pattern is calculated is 1.66 kHz to thereby provide a switching period ($T_s$) of 0.6 ms. When the switching block 31a is switched 'on', the switching block 31d is also initially switched 'on' to thereby enable current to be provided to a load. During the initial period when the switching block 31d is switched 'on', the switching blocks 31b and 31c are switched 'off'. However, in the middle of the 'on' period of the switching block 31a, the switching block 31c is switched 'on' and the switching block 31d 'off'. This means that the current to the load is interrupted for the duration that the switching block 31c is switched 'on'. The result of this sequence is that the voltage across the load consists of two pulses within the switching period $T_s$. As a result of this sequence, the switching frequency of the series injection inverter 12a has been effectively doubled from 1.66 kHz to 3.33 kHz. Switching losses in the switching blocks 31a,31b,31c,31d have therefore been effectively halved for this switching frequency of 3.33 kHz. A further advantage of this frequency doubling is a faster response time for the dynamic series voltage compensator 10.

Twice within every switching period, the times $T_a$ and $T_b$ are computed by the controller 11 in order that the mean value of output voltage pulses of the dynamic series injection inverter 12a are equal to the mean value of the compensation voltage required over a respective half switching period, 0.5 $T_s$. The mean value of the compensation voltage, $V_{comp}$, is related to the half switching period 0.5 $T_s$ dc bus voltage, $V_{dc}$, at node 38, and the time $T_b$ by the following relationship:

$$V_{comp}=V_{dc}\times(T_b/0.5T_s)$$

or $$T_b=(V_{comp}/V_{dc})\times 0.5T_s$$

giving $$T_a=(0.5T_s-T_b)/2 \text{ if } T_a T_c$$

The time $T_b$ is therefore dependent not only on the value of $V_{comp}$ required to restore the voltage dip, but also dc bus voltage $V_{dc}$. This means that with this calculation, the value of $V_{comp}$ is corrected for dc bus variations. Then, knowing the value of $T_a$ and $T_b$, the firing time of the switching block 31a is $T_a$ and the firing time of the switching block 31c is ($T_a+T_b$). Similarly in the next half switching period 0.5 $T_s$, the turnoff time of the switching block 31a is ($T_a+T_b$) and the turn-off time of the switching block 31c is $T_a$. The controller 11 carries out these calculations for each of the series injection inverters 12a,12b,12c for all three phases and also keeps track of the half switching period 0.5 $T_s$ in each of the three phases. Each new half switching period 0.5 $T_s$ for each phase is computed at approximately 0.3 ms.

Figure 6A:
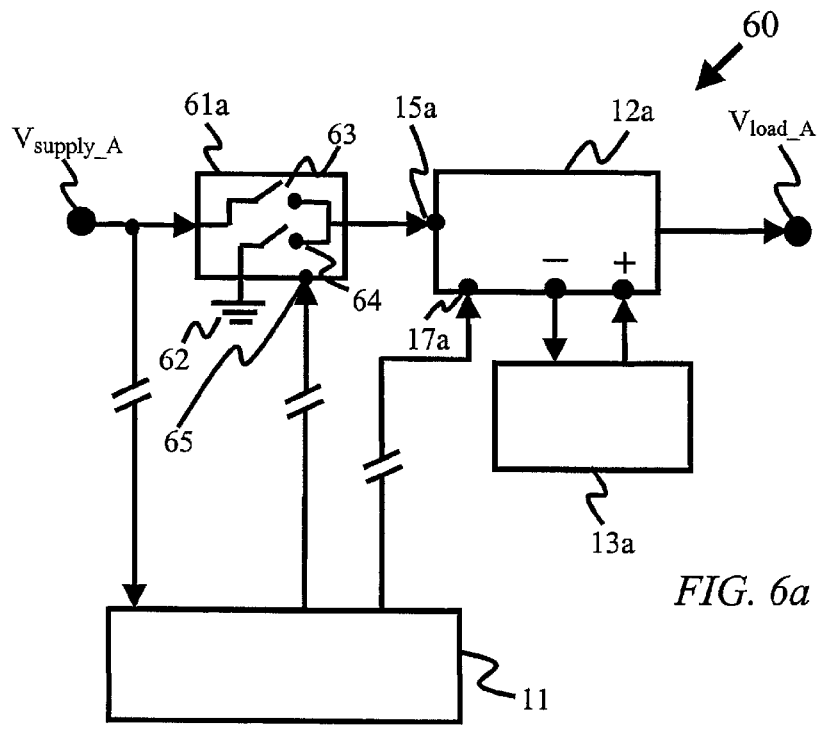
FIG. 6a and FIG. 6b are schematic block diagrams illustrating two respective alternate embodiments of the dynamic series voltage compensator of FIG. 1.

Referring now to FIG. 6a, a schematic block diagram of an alternate embodiment 60 of the dynamic series voltage compensator 10. As ac electric power systems are also subjected to voltage collapses, the alternate embodiment 60 provides for respective solid-state earthing switches. Only one solid-state earthing switch 61a is indicated for the dynamic series voltage compensator 10 in order to simplify FIG. 6a This solid-state earthing switch 61a selectably connects the input 15a of the series injection inverter 12a to a reference ground 62 or to the supply voltage $V_{supply\_A}$. This solid-state earthing switch 61a is disposed on a part of the conductor 14a that is on a supply side of the supply voltage $V_{supply\_A}$ and prior to the input 15a. The solid-state earthing switch 61a has two switches 63,64. In normal operations and voltage dip conditions, the controller 11 sets switch 63 in a closed position and switch 64 in an open position, thereby connecting the supply voltage $V_{supply\_A}$ to the series injection inverter 12a. When the controller 11 detects a voltage collapse, a switch control signal is provided to a control input 65 to open switch 63 and close switch 64 for the duration of the voltage collapse.

Figure 6B:
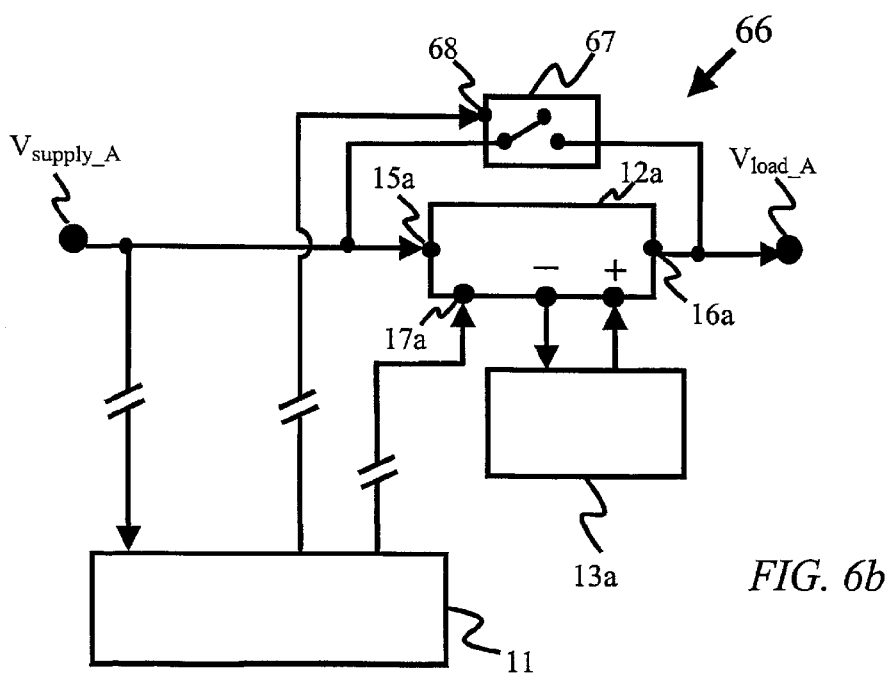

Referring now to FIG. 6b, a schematic block diagram of another alternate embodiment 66 of the dynamic series voltage compensator 10. This alternate embodiment 66 provides for a solid-state bypass switch 67 that is connected between the input 15a and the output 16a of the series injection inverter 12a. Under normal conditions with no voltage dips, the solid-state bypass switch 67 operates in the closed position. In this closed position, load current passes through the solid-state bypass switch 67 and not the series voltage injection inverter 12a This enables the alternate embodiment 66 to operate at a higher efficiency compared to the dynamic series voltage compensator 10 without the solid-state bypass switch 67. This is because the load current has lower losses when conducted through the solid-state bypass switch 67 than when conducted through the series voltage injection inverter 12a. When a voltage dip occurs on the ac electric power system, the controller 11 detects the voltage dip and sends a first control signal, via a control input 68, to open the solid-state bypass switch 67. The controller 11 also sends a second, and simultaneous, control signal to the series voltage injection inverter 12a, via the control input 17a, to activate the series injection inverter 12a The solid-state bypass switch 67 remains in an 'off' position and the series voltage injection inverter 12a is in an operating condition for the duration of the voltage dip. When the voltage dip ceases, the controller 11 sends out simultaneous control signals to the solid-state bypass switch 67 and the series voltage injection inverter 12a to thereby close the solid-state bypass switch 67 and to set the series voltage injection inverter 12a in a non-operating condition.

Figure 7:
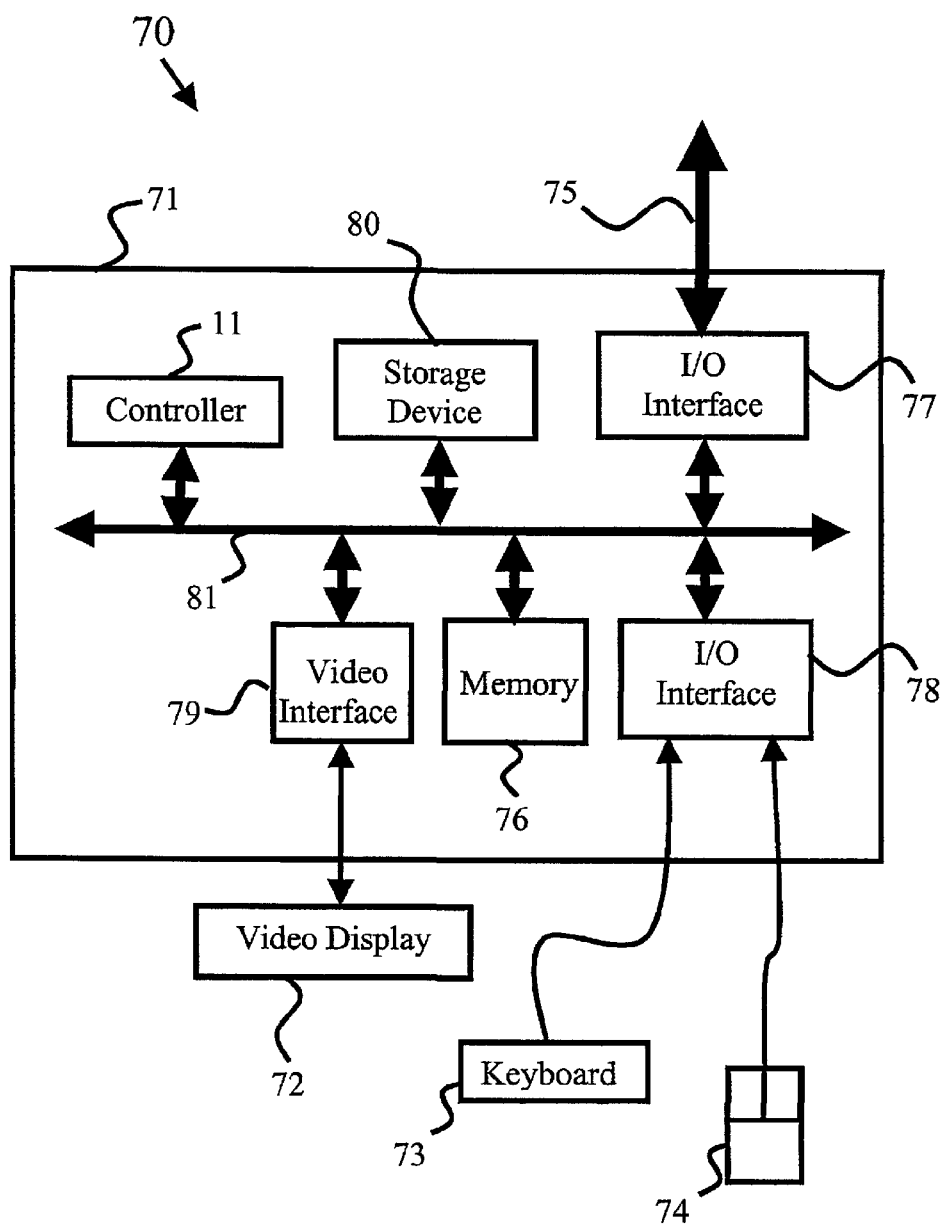
FIG. 7 is a block diagram of an example of a computer system capable of implementing the method of FIG. 2 with the dynamic voltage compensator of FIG. 1.

The controller 11 in the embodiments of the invention can be implemented using a computer program product that includes, for example, a computer system 70 as shown in FIG. 7. In particular, the controller 11 can be implemented as software, or computer readable program code, executing on the computer system 70.

The computer system 70 includes a computer 71, a video display 72, input devices 73, 74. A communication input/ output (I/O) signal bus 75 provides for inputs and outputs between the controller 11 and the dynamic series voltage compensator 10 and the conductor 14a.

The computer 71 includes the controller 11, a memory 76 that may include random access memory (RAM) and read-only memory (ROM), input/output (I/O) interfaces 77, 78, a video interface 79, and one or more storage devices generally represented by in FIG. 7 with a storage device 80. The memory 76 can be used to store the digital signals and serve as the dynamic look-up table 44. When stored in the memory 76, the digitals signals derived from the present voltage cycle period can overwrite the stored data of the preceding voltage cycle period by control signals from the controller 11.

The video interface 79 is connected to the video display 72 and provides video signals from the computer 71 for display on the video display 72. User input to operate the computer 71 can be provided by one or more of the input devices 73, 74 via the I/O interfaces 78. For example, a user of the computer 71 can use a keyboard as I/O interface 73 and/or a pointing device such as a mouse as I/O interface 74. The keyboard and the mouse provide input to the computer 71. The storage device 80 can consist of one or more of the following: a floppy disk, a hard disk drive, a magneto-optical disk drive, CD-ROM, magnetic tape or any other of a number of non-volatile storage devices well known to those skilled in the art Each of the elements in the computer system 71 is typically connected to other devices via a bus 81 that in turn can consist of data, address, and control buses.

The method steps for compensating voltage dips in an ac electric power system using the dynamic series voltage compensator 10 is effected by instructions in the software that are carried out by the computer system 70. Again, the software may be implemented as one or more modules for implementing the method steps. That is, the controller 11 can be a part of a computer readable program code that usually performs a particular function or related functions.

In particular, the software may be stored in a computer readable medium, including the storage device 80. The computer system 70 includes the computer readable medium having such software or program code recorded such that instructions of the software or the program code can be carried out. The use of the computer system 70 preferably effects advantageous apparatuses for compensating voltage dips in an ac electric power system using the dynamic series voltage compensator 10 in accordance with the embodiments of the invention.

The computer system 70 simply provides for illustrative purposes and other configurations can be employed without departing from the scope and spirit of the invention. The foregoing is merely exemplary of the types of computers or computer systems with which the embodiments of the invention may be practised. Typically, the processes of the embodiments are resident as software or a computer readable program code recorded on a hard disk drive (generally depicted as the storage device 80) as the computer readable medium, and read and controlled using the controller 11. Intermediate storage of the program code and media content data and any data fetched from the network may be accomplished using the memory 76, possibly in concert with the storage device 80.

In some instances, the program may be supplied to the user encoded on a CD-ROM or a floppy disk (both generally depicted by the storage device 80), or alternatively could be read by the user from the network via a modem device connected to the computer 71. Still further, the computer system 70 can load the software from other computer readable media This may include magnetic tape, a ROM or integrated circuit, a magneto-optical disk, a radio or infrared transmission channel between the computer and another device, a computer readable card such as a PCMCIA card, and the Internet and Intranets including email transmissions and information recorded on Internet sites and the like. The foregoing is merely exemplary of relevant computer readable media Other computer readable media may be practised without departing from the scope and spirit of the invention.

The dynamic series voltage compensator 10 as described in the above embodiments of the invention advantageously overcomes or at least alleviates the disadvantages of conventional series voltage compensator for compensating voltage dips in ac electric power systems.

In the foregoing description, a dynamic series voltage compensator, a method and a computer program product for compensating voltage dips in an electric power system are described. Although two embodiments are described, it shall be apparent to one skilled in the art in view of these embodiments that numerous changes and/or modifications can be made without departing from the scope and spirit of the invention.

What is claimed is:

1. A dynamic series voltage compensator for compensating voltage dips in an alternating current electric power system providing at least one supply voltage, each of said at least one supply voltage being at a respective phase, said dynamic series voltage compensator including:
   means for independently monitoring each of said at least one supply voltage;
   means for generating digital signals indicative of voltage magnitude of said each of said at least one supply voltage over a present voltage cycle period;

means for comparing said digital signals with stored data indicative of voltage magnitude of said each of said at least one supply voltage over a preceding voltage cycle period;

means for determining difference between said digital signals and said stored data at corresponding time periods within said present and preceding voltage cycle periods;

and means for controlling, when said difference exceeds a predetermined value for a corresponding time period, at least one series injection inverter to inject a compensation voltage directly to a respective conductor on which said each of said at least one supply voltage is supplied, said compensation voltage having a magnitude to compensate said each of said at least one supply voltage to a voltage magnitude of said preceding voltage cycle period immediately before a voltage dip at said corresponding time period.

2. The dynamic series voltage compensator as claimed in claim 1, wherein said generating means includes means for filtering said digital signals.

3. The dynamic series voltage compensator as claimed in claim 1, and further including means for storing said digital signals.

4. The dynamic series voltage compensator as claimed in claim 3, wherein said storing means includes means for locking said stored data.

5. The dynamic series voltage compensator as claimed in claim 1, wherein said controlling means includes means for controlling said at least one series injection inverter to receive energy from at least one energy storage device for said compensation voltage.

6. The dynamic series voltage compensator as claimed in claim 1, wherein said controlling means includes means for controlling at least one solid-state earthing switch, said at least one solid-state earthing switch being to selectably connect an input of said at least one series injection inverter to a reference ground or to said each of said at least one supply voltage.

7. The dynamic series voltage compensator as claimed in claim 1, wherein said controlling means includes means for controlling at least one pulse generator, said at least one pulse generator providing pulses synchronised to drive said at least one series injection inverter to provide two output pulses within one switching period.

8. The dynamic series voltage compensator as claimed in claim 1, wherein said controlling means includes means for controlling at least one solid-state bypass switch, said at least one solid-state bypass switch-connecting an input of said at least one series injection inverter to an output of said at least one series injection inverter.

9. A method for compensating voltage dips in an alternating current electric power system providing at least one supply voltage, each of said at least one supply voltage being at a respective phase, said method including the steps of:

independently monitoring each of said at least one supply voltage;

generating, in response to said independently monitoring step, digital signals indicative of voltage magnitude of said each of said at least one supply voltage over a present voltage cycle period;

comparing said digital signals with stored data indicative of voltage magnitude of said each of said at least one supply voltage over a preceding voltage cycle period;

determining difference between said digital signals and said stored data at corresponding time periods within said present and preceding voltage cycle periods;

and controlling, when said difference exceeds a predetermined value for a corresponding time period, at least one series injection inverter to inject a compensation voltage directly to a respective conductor on which said each of said at least one supply voltage is supplied, said compensation voltage having a magnitude to compensate said each of said at least one supply voltage to a voltage magnitude of said preceding voltage cycle period immediately before a voltage dip at said corresponding time period.

10. The method as claimed in claim 9, wherein said generating step includes the step of filtering said digital signals.

11. The method as claimed in claim 9, and further including the step of storing said digital signals.

12. The method as claimed in claim 11, wherein said storing step includes the step of locking said stored data.

13. The method as claimed in claim 9, wherein said controlling step includes the step of controlling said at least one series injection inverter to receive energy from at least one energy storage device for said compensation voltage.

14. The method as claimed in claim 9, wherein said controlling step includes the step of controlling at least one solid-state earthing switch, said at least one solid-state earthing switch being to selectably connect an input of said at least one series injection inverter to a reference ground or to said each of said at least one supply voltage.

15. The method as claimed in claim 9, wherein said controlling step includes the step of controlling at least one pulse generator, said at least one pulse generator providing pulses synchronised to drive said at least one series injection inverter to provide two output pulses within one switching period.

16. The method as claimed in claim 9, wherein said controlling step includes the step of controlling at least one solid-state bypass switch, said at least one solid-state bypass switch connecting an input of said at least one series injection inverter to an output of said at least one series injection inverter.

17. A computer program product with a computer usable medium having a computer readable program code means embodied therein for compensating voltage dips in an alternating current electric power system providing at least one supply voltage, each of said at least one supply voltage being at a respective phase, said computer program product including:

computer readable program code means for independently monitoring each of said at least one supply voltage;

computer readable program code means for generating digital signals indicative of voltage magnitude of said each of said at least one supply voltage over a present voltage cycle period;

computer readable program code means for comparing said digital signals with stored data indicative of voltage magnitude of said each of said at least one supply voltage over a preceding voltage cycle period;

computer readable program code means for determining difference between said digital signals and said stored data at corresponding time periods within said present and preceding voltage cycle periods;

and computer readable program code means for controlling, when said difference exceeds a predetermined value for a corresponding time period, at least one series injection inverter to inject a compensation voltage directly to a respective conductor on which said each of said at least one supply voltage is supplied, said compensation voltage having a magnitude to compensate said each of said at least one supply voltage to a voltage magnitude of said preceding voltage cycle period immediately before a voltage dip at said corresponding time period.

18. The computer program product as claimed in claim 17, wherein said computer readable program code means for generating includes computer readable program code means for filtering said digital signals.

19. The computer program product as claimed in claim 17, and further including computer readable program code means for storing said digital signals.

20. The computer program product as claimed in claim 19, wherein said computer readable program code means for storing includes computer readable program code means for locking said stored data.

21. The computer program product as claimed in claim 17, wherein said computer readable program code means for controlling includes computer readable program code means for controlling said at least one series injection inverter to receive energy from at least one energy storage device for said compensation voltage.

22. The computer program product as claimed in claim 17, wherein said computer readable program code means for controlling includes computer readable program code means for controlling at least one solid-state earthing switch, said at least one solid-state earthing switch being to selectably connect an input of said at least one series injection inverter to a reference ground or to said each of said at least one supply voltage.

23. The computer program product as claimed in claim 17, wherein said computer readable program code means for controlling includes computer readable program code means for controlling at least one pulse generator, said at least one pulse generator providing pulses synchronised to drive said at least one series injection inverter to provide two output pulses within one switching period.

24. The computer program product as claimed in claim 17, wherein said computer readable program code means for controlling includes computer readable program code means for controlling at least one solid-state bypass switch, said at least one solid-state bypass switch connecting an input of said at least one series injection inverter to an output of said at least said one series injection inverter.

* * * * *